US010807418B2

United States Patent
Isaka (10) Patent No.: US 10,807,418 B2
(45) Date of Patent: Oct. 20, 2020

(54) PNEUMATIC TIRE

(71) Applicant: Sumitomo Rubber Industries, Ltd., Kobe-shi, Hyogo (JP)

(72) Inventor: Wataru Isaka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 322 days.

(21) Appl. No.: 15/795,043

(22) Filed: Oct. 26, 2017

(65) Prior Publication Data

US 2018/0134097 A1    May 17, 2018

(30) Foreign Application Priority Data

Nov. 16, 2016   (JP) .................................. 2016-223473

(51) Int. Cl.
*B60C 15/024*    (2006.01)
*B60C 15/06*     (2006.01)

(52) U.S. Cl.
CPC ............ *B60C 15/024* (2013.01); *B60C 15/06* (2013.01); *B60C 15/0242* (2013.01); *B60C 15/0247* (2013.01); *B60C 2015/0245* (2013.01); *B60C 2015/0614* (2013.01); *B60C 2200/04* (2013.01); *B60C 2200/10* (2013.01)

(58) Field of Classification Search
CPC ............. B60C 15/024; B60C 15/0242; B60C 2015/0245; B60C 15/0247
See application file for complete search history.

(56) References Cited

U.S. PATENT DOCUMENTS

2015/0367688 A1*  12/2015  Kawakami ............ B60C 15/024
                                                    152/544

FOREIGN PATENT DOCUMENTS

| JP | 5-77615 A | 3/1993 |
|----|-----------|--------|
| JP | 11-192821 A | 7/1999 |
| JP | 2000-198327 A | 7/2000 |
| JP | 2007-160983 A | 6/2007 |
| JP | 2010-12829 A | 1/2010 |

OTHER PUBLICATIONS

JP 11-192821 machine translation (Year: 1999).*
JP5-77615 machine translation (Year: 1993).*
Extended European Search Report for Application No. 17198572.4, dated Mar. 23, 2018.

* cited by examiner

*Primary Examiner* — Timothy Kennedy
*Assistant Examiner* — Alexander A Wang
(74) *Attorney, Agent, or Firm* — Birch, Stewart, Kolasch & Birch, LLP (57) ABSTRACT

A pneumatic tire includes bead portions, each having a bead bottom surface. The bead bottom surface includes a toe-side portion extending axially outwardly from a bead toe at an angle α in a range of from 17 to 24 degrees with respect to the tire axial direction, a heel-side portion positioned axially outside the toe-side portion and extending axially outwardly at an angle β in a range of from 3 to 7 degrees with respect to the tire axial direction, and a heel-side arc portion smoothly connecting between the heel-side portion and a flange contacting surface with a radius of curvature (R) in a range of from 1.5 to 3.5 mm.

13 Claims, 5 Drawing Sheets

PNEUMATIC TIRE

TECHNICAL FIELD

The present invention relates to a pneumatic tire having bead cores.

BACKGROUND ART

Conventionally, in a pneumatic tire, it is known that steering stability is deteriorated since rigidity of bead portions is decreased due to a gap between a rim and bead portions generated by large lateral force applied to the pneumatic tire during cornering, for example. In order to suppress the formation of the gap between a rim and the bead portions, it is possible to increase adhesion between a rim and the bead portions by increasing the rigidity of the bead portions to increase tightening force on the rim.

However, it is difficult to mount the bead portions of such a pneumatic tire on a rim, therefore, it is possible that engagement of the bead portions with a rim is easily deteriorated.

SUMMARY OF THE INVENTION

The present invention was made in view of the above, and a primary object thereof is to provide a pneumatic tire capable of improving the engagement with a rim and the steering stability in a good balance by improving a bead bottom surface.

The pneumatic tire according to the present invention comprises a pair of bead portions each having a bead core disposed therein, each of the bead portions having a bead toe, a bead bottom surface, and a flange contacting surface which is an outer surface of the bead portion in a tire axial direction, wherein in a pre-mounted state in which the bead portions are held so that a distance in the tire axial direction between the flange contacting surfaces coincides with a rim width of a standard rim, each of the bead bottom surfaces is inclined outwardly in a tire radial direction from the bead toe toward the axially outside, and comprises a toe-side portion, a heel-side portion, and a heel-side arc portion, the toe-side portion extends axially outwardly from the bead toe at an angle α in a range of from 17 to 24 degrees with respect to the tire axial direction, the heel-side portion is positioned axially outside the toe-side portion, and extends axially outwardly at an angle β in a range of from 3 to 7 degrees with respect to the tire axial direction, and the heel-side arc portion smoothly connects between the heel-side portion and the flange contacting surface with a radius of curvature (R) in a range of from 1.5 to 3.5 mm.

It is preferred that, in the pre-mounted state, a bead bottom width (A), which is a distance in the tire axial direction between the bead toe and the flange contacting surface, is in a range of from 1.7 to 2.4 times a maximum width (B) in the tire axial direction of the bead core.

It is preferred that, in the bead portion in the pre-mounted state, a rubber thickness (a) in the tire axial direction between the bead core and the flange contacting surface is smaller than a rubber thickness (b) in the tire axial direction between the bead core and the bead toe.

It is preferred that the rubber thickness (b) is not less than 0.2 times a bead bottom width (A) which is a distance in the tire axial direction between the bead toe and the flange contacting surface.

It is preferred that the bead portion is provided axially inside the bead core with a first rubber portion and a second rubber portion disposed axially inside the first rubber portion, and the second rubber portion contains more butyl rubber than the first rubber portion.

DESCRIPTION OF THE PREFERRED EMBODIMENT

An embodiment of the present invention will now be described in conjunction with accompanying drawings.

Figure 1:
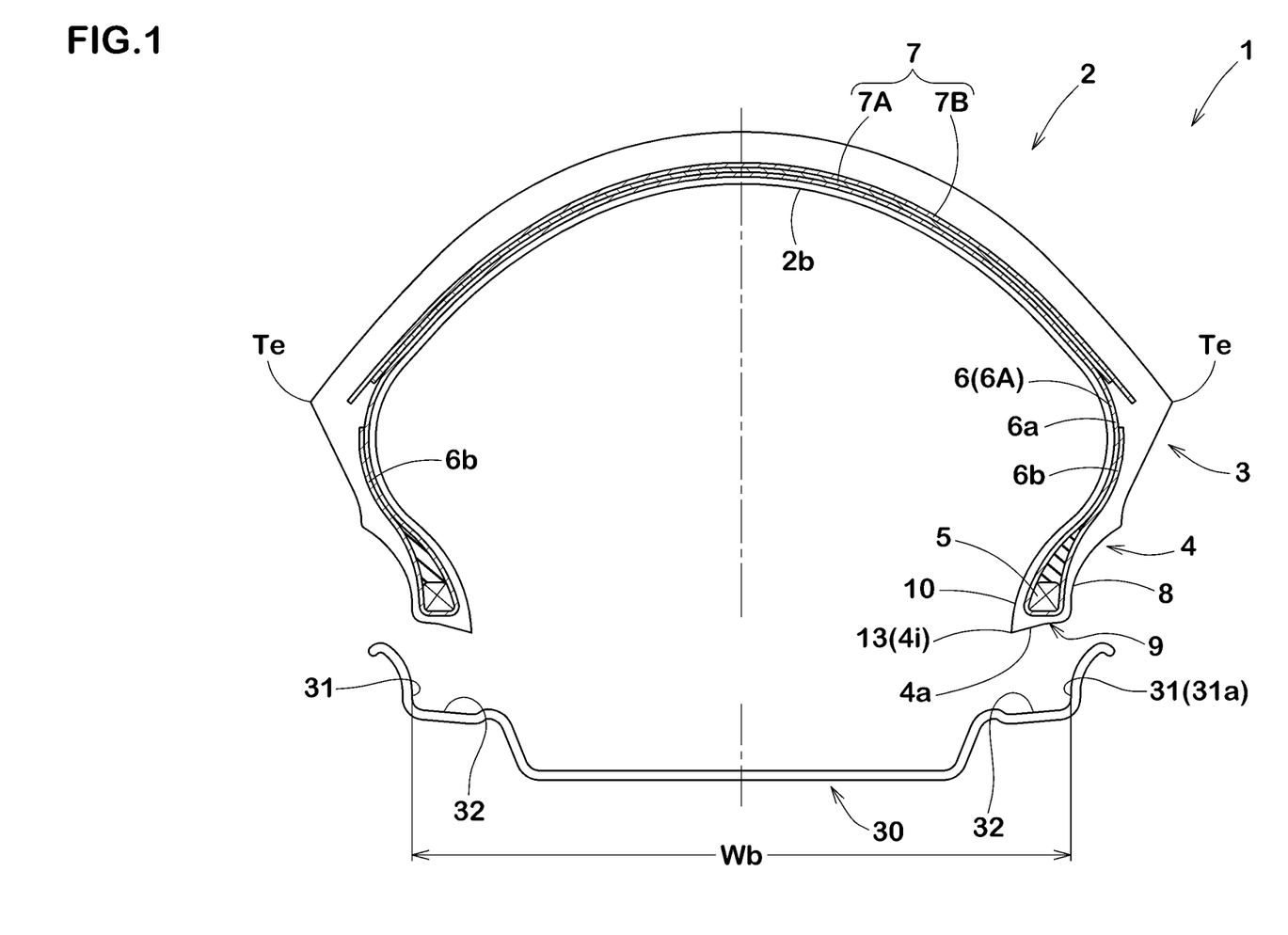
FIG. 1 is a cross-sectional view showing a pneumatic tire as an embodiment of the present invention before mounted on a rim.

FIG. 1 is a tire meridian cross section including a tire rotational axis (not shown) of a pneumatic tire (hereinafter may be simply referred to as "tire") 1 showing an embodiment of the present invention in a pre-mounted state. The present invention is suitably used as a tire 1 for passenger cars as well as for motorcycles.

In the present specification, the "pre-mounted state" means a state in which the bead portions 4 are held so that a distance (Wa) (shown in FIG. 2) in a tire axial direction between flange contacting surfaces 8, which are outer surfaces of the bead portions 4 in the tire axial direction, coincides with a rim width (Wb) of a standard rim (hereinafter, may be simply referred to as "rim") 30 on which the tire 1 is to be mounted. Hereinafter, unless otherwise noted, sizes and the like of various parts of the tire 1 are values measured in the pre-mounted state.

The "standard rim" 30 is a wheel rim specified for the concerned tire by a standard included in a standardization system on which the tire is based, for example, the "normal wheel rim" in JATMA, "Design Rim" in TRA, and "Measuring Rim" in ETRTO.

As shown in FIG. 1, the rim 30 in this embodiment includes rim flange surfaces 31 with which the flange contacting surfaces 8 contact and rim sheet surfaces 32 arranged on inner sides of the rim flange surfaces 31 in the tire axial direction. Each of the rim flange surfaces 31 in this embodiment includes a straight portion (31a) (shown in FIG. 2) extending straight. On each of the rim sheet surface 32, an inner surface (4a) in a tire radial direction of each of the bead portions 4 is seated. The rim sheet surfaces 32 in this embodiment are inclined at angles θ (shown in FIG. 2) of 5 degrees with respect to the tire axial direction.

The pneumatic tire 1 in this embodiment includes bead cores 5 arranged inside the bead portions 4, a carcass 6 extending between the bead cores 5 of the bead portions 4 via a tread portion 2 and sidewall portions 3, and a belt layer 7 arranged radially outside the carcass 6.

The carcass 6 is formed of at least one, one in this embodiment, carcass ply 6A. The carcass ply 6A includes a main body portion (6a) which extends in a toroidal manner between a pair of the bead cores 5, and a pair of turned up portions (6b) extending from both sides of the main body portion (6a) and each turned up around the bead core 5 from inside to outside in the tire axial direction.

The belt layer 7 is arranged inside the tread portion 2 and extends to the vicinity of tread edges (Te) on both sides. The belt layer 7 in this embodiment comprises two belt plies 7A and 7B arranged inside and outside in the tire radial direction.

Each of the bead portions 4 in this embodiment, in the tire meridian section, includes the flange contacting surface 8, a bead bottom surface 9 extending continuously from the flange contacting surface 8, and a bead inner side surface 10 extending continuously from the bead bottom surface 9. The bead bottom surface 9 includes a bead toe 13 which is a radially innermost end 4i of the bead portion. The bead toe 13 in this embodiment is also an axially innermost end of the bead portion 4.

Figure 2:
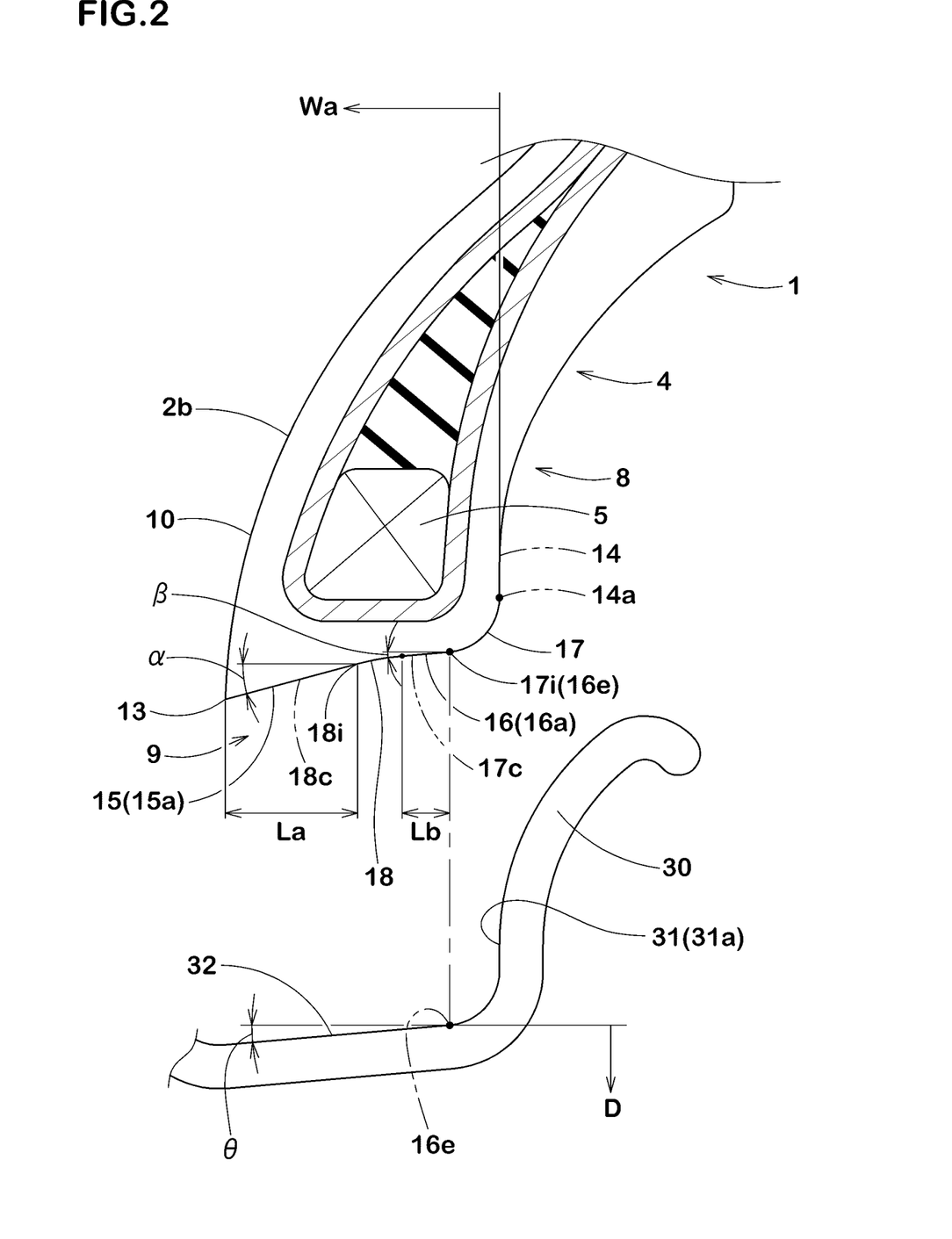
FIG. 2 is an enlarged view of a bead portion of FIG. 1.

As shown in FIG. 2, in the tire 1 in a standard state (shown in FIG. 3), the flange contacting surface 8 in this embodiment includes a first straight portion 14 which is in contact with the straight portion (31a) of the rim flange surface 31 and extends straight in the tire radial direction. In the pre-mounted state, the flange contacting surface 8 in this embodiment includes an embodiment in which the flange contacting surface 8 does not extend straight.

The distance (Wa) between the flange contacting surfaces 8 is a distance measured at a same position as a radially inner end (14a) of the first straight portion 14 of the tire 1 in the standard state.

The "standard state" is a state in which the tire 1 is mounted on the standard rim 30, inflated to a standard pressure, and loaded with no tire load. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The bead inner side surface 10 in this embodiment extends outwardly in the tire radial direction from the bead toe 13 without contacting the rim 30 to form an inner cavity surface (2b) of the tire 1.

The bead bottom surface 9 is inclined radially outwardly from the bead toe 13 toward the axially outside and is arranged axially inside the flange contacting surfaces 8.

Each of the bead bottom surfaces 9 in this embodiment includes a toe-side portion 15, a heel-side portion 16, and a heel-side arc portion 17.

In the pre-mounted state, the toe-side portion 15 extends from the bead toe 13 axially outwardly at an angle α in a range of from 17 to 24 degrees with respect to the tire axial direction. If the angle α is less than 17 degrees, closeness in contact between the toe-side portion 15 and the rim sheet surface 32 when the tire is inflated is deteriorated, therefore, the steering stability is deteriorated. If the angle α is larger than 24 degrees, engagement with the rim is deteriorated.

The toe-side portion 15 in this embodiment includes a second straight portion (15a) extending straight in the pre-mounted state. The second straight portion (15a) improves the engagement and the closeness in contact with the rim sheet surfaces 32 in a good balance.

It is preferred that a length (La) in the tire axial direction of the second straight portion (15a) is, for example, in a range of from 35% to 65% of a bead bottom width (A) (shown in FIG. 4) which is a distance in the tire axial direction between the bead toe 13 and the flange contacting surfaces 8. If the length (La) of the second straight portion (15a) is less than 35% of the bead bottom width (A), it is possible that the closeness in contact with rim sheet surface 32 is deteriorated. If the length (La) of the second straight portion (15a) is greater than 65% of the bead bottom width (A), it is possible that the engagement with rim sheet surface 32 is deteriorated. The bead bottom width (A) in this embodiment is a distance in the tire axial direction between the bead toe 13 and the inner end (14a) of the first straight portion 14 of the flange contacting surfaces 8.

The heel-side portion 16 is arranged axially outside the toe-side portion 15 and extends axially outwardly at an angle β in a range of from 3 to 7 degrees with respect to the tire axial direction. If the angle β of the heel-side portion 16 is less than 3 degrees or larger than 7 degrees, the closeness in contact between the heel-side portion 16 and the rim sheet surface 32 is deteriorated. Further, when the tire 1 is mounted on the rim 30, rotational movement around a cross-sectional center of the bead core 5 as a center axis is prevented, therefore, the engagement with the rim is deteriorated.

The heel-side portion 16 in this embodiment includes a third straight portion (16a) extending straight.

The third straight portion (16a) configured as such improves the closeness in contact with the rim sheet surface 32, therefore, the steering stability is improved.

In this embodiment, a distance between contact points of outer ends (16e) in the tire axial direction of the heel-side portions 16, the outer ends (16e) in the tire axial direction of the third straight portions (16a) in this embodiment, and the rim 30 is set to be a diameter (D) which is smaller by 0 to 1.5 mm (normally 1.0 mm) than a rim diameter specified by a standard.

It is preferred that a length (Lb) in the tire axial direction of the third straight portion (16a) is smaller than the length (La) of the second straight portion (15a), for example. The rotational movement around the cross-sectional center of the bead core 5 as a center axis occurs during cornering in which large lateral force is generated, therefore, a large moment is applied to the second straight portion (15a), which is greatly spaced away from the bead cores 5 in the tire axial direction, compared to the third straight portion (16a). Thereby, by making the length (La) of the second straight portion (15a) larger than the length (Lb) of the third straight portion (16a), great closeness in contact with the rim sheet surfaces 32 is obtained on a side of the second straight portion (15a), therefore, it is possible that the steering stability is greatly improved. From this point of view, it is preferred that the length (Lb) of the third straight portion (16a) is in a range of from 10% to 30% of the bead bottom width (A).

The toe-side portion 15 and the heel-side portion 16 in this embodiment are smoothly connected by an arc portion 18 having an arc shape convex radially outwardly. The arc portion 18 configured as such suppresses formation of a gap with the rim sheet surface 32, therefore, it is useful for improving the closeness in contact. A tangent (18c) at an inner end (18i) in the tire axial direction of the arc portion 18 in this embodiment coincides with the second straight portion (15a).

Although not particularly limited, it is preferred that the arc portion 18 has a radius of curvature r (shown in FIG. 4) in a range of from 3 to 8 mm.

Note that if either the toe-side portion 15 or the heel-side portion 16 does not include the straight portion but is formed only in an arc shape, the toe-side portion 15 and the heel-side portion 16 are divided by the straight portion and the arc portion. Further, if the toe-side portion 15 or the heel-side portion 16 is formed only in an arc shape, the angle α or β with respect to the tire axial direction is specified by an imaginary line connecting both ends of the arc shape in the tire axial direction.

The heel-side arc portion 17 connects smoothly between the heel-side portion 16 and the flange contacting surfaces 8. The heel-side arc portion 17 in this embodiment is smoothly connected with the first straight portion 14 of the flange contacting surfaces 8 of the tire 1 in the standard state. Further, the heel-side arc portion 17 in this embodiment is smoothly connected with the third straight portion (16a) of the heel-side portion 16. More specifically, a tangent (17c) at an inner end (17i) in the tire axial direction of the heel-side arc portion 17 coincides with the third straight portion (16a).

Figure 4:
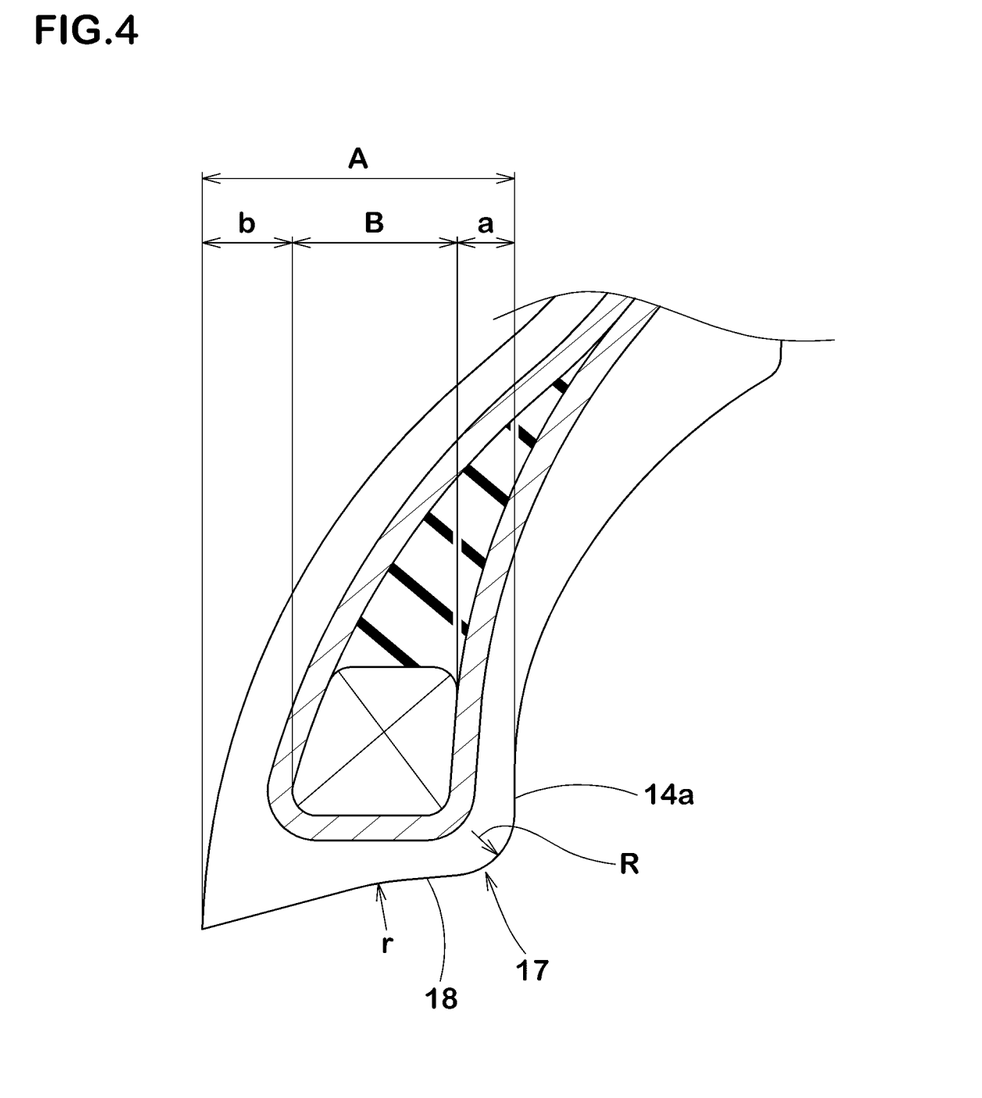
FIG. 4 is an enlarged view of the bead portion of FIG. 1.

As shown in FIG. 4, in the pre-mounted state, a radius of curvature (R) of the heel-side arc portion 17 is in a range of from 1.5 to 3.5 mm. If the radius of curvature (R) is less than 1.5 mm or larger than 3.5 mm, the closeness in contact between the rim sheet surface 32 and the heel-side arc portion 17 is deteriorated, therefore, the steering stability is deteriorated.

It is preferred that, in the pre-mounted state, the bead bottom width (A) is in a range of from 1.7 to 2.4 times a maximum width (B) in the tire axial direction of the bead core 5. If the bead bottom width (A) is less than 1.7 times the maximum width (B) of the bead core 5, the closeness in contact between the bead bottom surface 9 and the rim sheet surface 32 is deteriorated, therefore, it is possible that the steering stability is deteriorated. If the bead width (A) is larger than 2.4 times the maximum width (B) of the bead core b 5, it is possible that the engagement between the bead portions 4 and the rim 30 is deteriorated.

In the bead portion 4 in the pre-mounted state, it is preferred that a rubber thickness (a) in the tire axial direction between the bead core 5 and the flange contacting surface 8 is smaller than a rubber thickness (b) in the tire axial direction between the bead core 5 and the bead toe 13. If the rubber thickness (a) is larger than the rubber thickness (b), rubber volume disposed on an inner side in the tire radial direction of the bead cores 5 is increased, large tightening force is not exerted, therefore, it is possible that the steering stability is deteriorated. If the rubber thickness (a) is excessively smaller than the rubber thickness (b), the rubber volume disposed on the inner side in the tire radial direction of the bead cores 5 is decreased and amount of deformation thereof is decreased, therefore, it is possible that the engagement is deteriorated. From this point of view, it is preferred that the rubber thickness (a) is in about an range of from 0.4 to 0.7 times the rubber thickness (b). The rubber thickness (a) in this embodiment is a distance in the tire axial direction between an outer end in the tire axial direction of the bead core 5 and the inner end (14a) when the tire 1 is in the standard state.

In order to effectively exert the above-described effects, it is preferred that the rubber thickness (b) is more than 0.2 times the bead bottom width (A). Further, it is preferred that the rubber thickness (b) is not greater than 0.4 times the bead bottom width (A).

Figure 3:
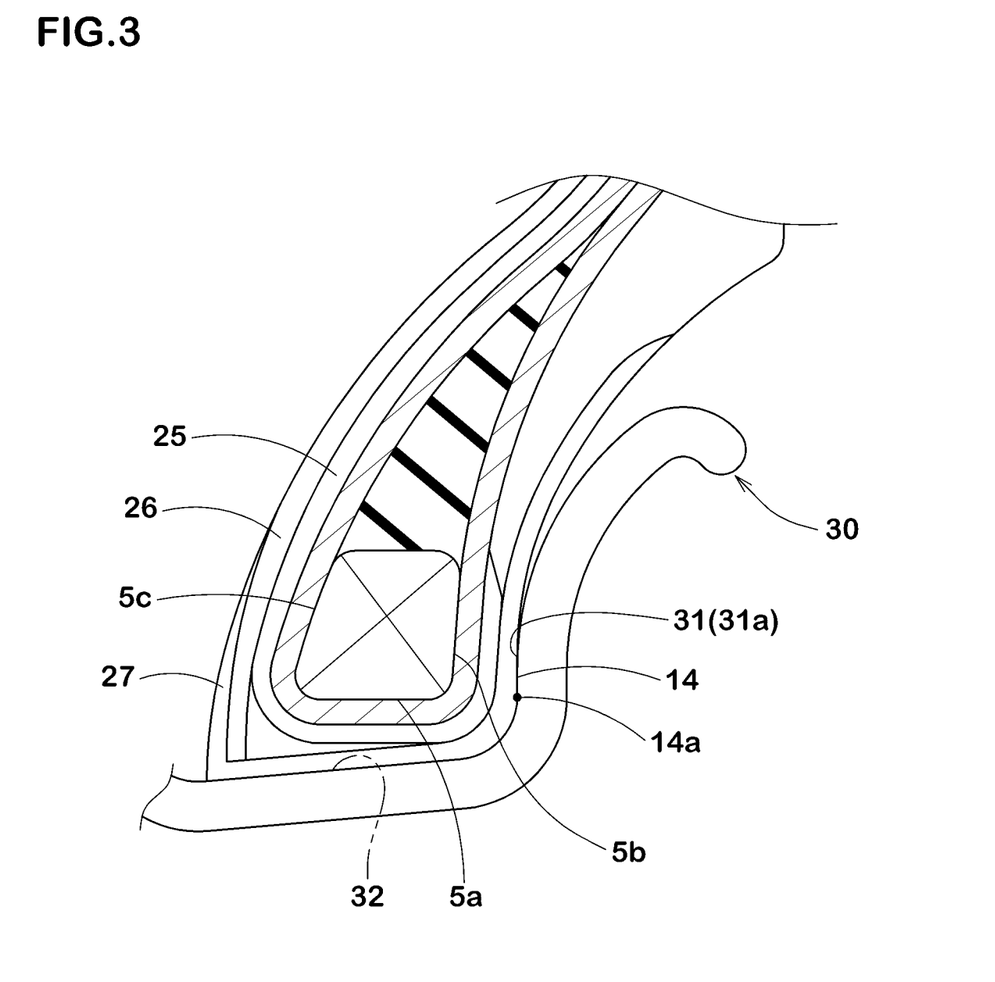
FIG. 3 is an enlarged view of the bead portion in a standard state.

As shown in FIG. 3, the bead portion 4 in this embodiment includes a first rubber portion 25 and a second rubber portion 26 disposed on an inner side in the tire axial direction of the first rubber portion 25. Thereby, rubber volume on axially inner sides of the bead portions 4 is secured, therefore, it is possible that the engagement with the rim and the steering stability are securely improved.

Further, the second rubber portion 26 in this embodiment contains more butyl rubber than the first rubber portion 25. Furthermore, the first rubber portion 25 is arranged on an axially inner side of the main body portion (6a) of the carcass 6. The second rubber portion 26 containing large amount of butyl rubber can maintain tire pressure of the tire 1 high, but has low adhesion with the carcass 6. Therefore, by providing the first rubber portion 25 having a small butyl rubber content between the second rubber portion 26 and the carcass 6, the adhesiveness is secured between the first rubber portion 25 and the second rubber portion 26 and between the first rubber portion 25 and the carcass 6, thereby, the steering stability is improved. It is preferred that the first rubber portion 25 configured as such is a tie gum having excellent adhesiveness, such as, for example, rubber composition containing large amount of natural rubber.

The first rubber portion 25 and the second rubber portion 26 in this embodiment extend in a toroidal manner between a pair of the bead cores 5. The first rubber portion 25 extends along an outer side surface (5b) in the tire axial direction of the bead core 5 together with the turned up portion (6b) of the carcass ply 6A and terminates there. The second rubber portion 26 extends along an inner side surface (5c) in the tire axial direction of the bead core 5 and terminates on an inner side in the tire radial direction than an inner side surface (5a) in the tire radial direction of the bead core 5. The first rubber portions 25 and the second rubber portions 26 configured as such increase the rubber volume of the bead portions 4 as compared with the bead portions of conventional tires, therefore, the engagement with the rim and the steering stability are further improved in a good balance.

Further, each of the bead portions 4 is provided with a chafer rubber 27 for preventing rim displacement. The chafer rubber 27 in this embodiment forms an outer surface of the bead portion 4 and is formed in a substantially u shape so as to surround the bead cores 5.

Figure 5A:
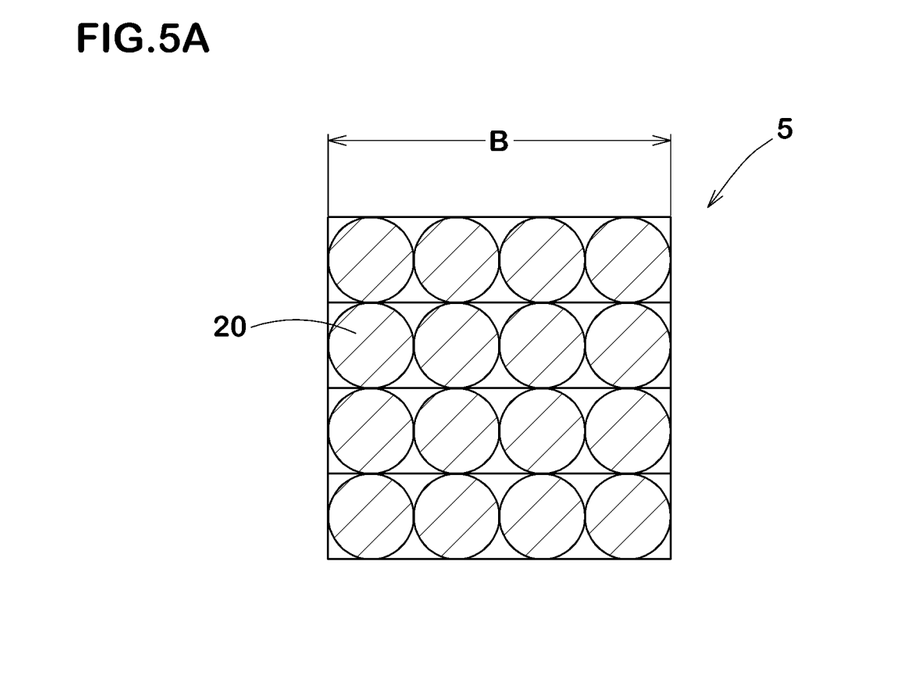
FIG. 5A is a cross-sectional view of a bead core according to another embodiment.
Figure 5B:
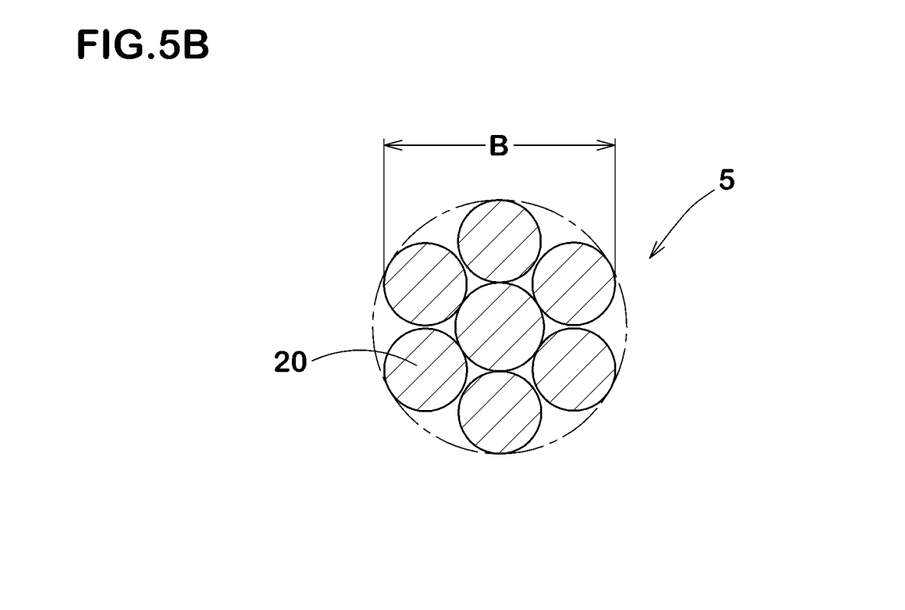
FIG. 5B is a cross-sectional view of a bead core according to another embodiment.

In the tire meridian cross-section, each of the bead cores 5 in this embodiment is formed in a trapezoid shape. However, the bead cores 5 are not limited to such a shape, but, as shown in FIGS. 5A and 5B, may have a polygonal shape including a quadrangular shape (shown in FIG. 5A), or a circular shape (shown in FIG. 5B). Note that metal wires 20 forming the bead cores 5 are shown in FIGS. 5A and 5B.

While detailed description has been made of the pneumatic tire as especially preferred embodiments of the present invention, the present invention can be embodied in various forms without being limited to the illustrated embodiments.

WORKING EXAMPLE (EXAMPLE)

Pneumatic tires for motorcycle of size 180/55ZR17 having the basic structure shown in FIG. 1 were made by way of test according to the specifications listed in Table 1, and then they were tested for the steering stability and the engagement with the rim. Test methods are as follows.
<Steering Stability>

Each of the test tires was mounted on a rear wheel of a test motorcycle with displacement of 1300 cc under the following conditions. Note that a commercial tire is mounted on a front wheel of the test motorcycle. Then a test driver drove the test motorcycle on a dry asphalt road surface of a circuit track of a test course, and running characteristics relating steering response, rigid impression, grip force, and transient characteristic were evaluated by the driver's feeling. The results are indicated by an evaluation point based on Reference 1 being 100, wherein a larger numerical value is better.
  Rim: MT5.50×17
  Tire pressure: 290 kPa
<Engagement>
  When each test tire was mounted on the rim, air was injected so that the tire pressure was gradually increased and pressure (engagement pressure) when the bead portion got over a hump of the rim was measured.

The test results are indicated by an index obtained by dividing the pressure of each of the examples and the references by the pressure of Reference 1 and multiplying by 100, wherein a larger numerical value is better.

The test results are shown in Table 1.

in a pre-mounted state in which the bead portions are held so that a distance in the tire axial direction between the flange contacting surfaces coincides with a rim width of a standard rim, each of the bead bottom surfaces is inclined outwardly in a tire radial direction from the bead toe toward the

TABLE 1

|  | Ref. 1 | Ex. 1 | Ex. 2 | Ex. 3 | Ref. 2 | Ref. 3 | Ref. 4 | Ex. 4 | Ex. 5 | Ref. 5 | Ref. 6 | Ex. 6 |
|---|---|---|---|---|---|---|---|---|---|---|---|---|
| Angle α [degree] | 16 | 23 | 17 | 24 | 16 | 25 | 23 | 23 | 23 | 23 | 23 | 23 |
| Angle β [degree] | 10 | 5 | 5 | 5 | 5 | 5 | 2 | 3 | 7 | 8 | 5 | 5 |
| Radius of curvature (R) of Heel-side arc portion [mm] | 4.0 | 2.5 | 2.5 | 2.5 | 2.5 | 2.5 | 2.5 | 2.5 | 2.5 | 2.5 | 1.0 | 1.5 |
| A/B | 1.7 | 2.0 | 2.0 | 2.0 | 2.0 | 2.0 | 2.0 | 2.0 | 2.0 | 2.0 | 2.0 | 2.0 |
| A | 10 | 12 | 12 | 12 | 12 | 12 | 12 | 12 | 12 | 12 | 12 | 12 |
| B | 6 | 6 | 6 | 6 | 6 | 6 | 6 | 6 | 6 | 6 | 6 | 6 |
| a/b | 1.0 | 0.5 | 0.5 | 0.5 | 0.5 | 0.5 | 0.5 | 0.5 | 0.5 | 0.5 | 0.5 | 0.5 |
| a | 2.0 | 2.0 | 2.0 | 2.0 | 2.0 | 2.0 | 2.0 | 2.0 | 2.0 | 2.0 | 2.0 | 2.0 |
| b | 2.0 | 4.0 | 4.0 | 4.0 | 4.0 | 4.0 | 4.0 | 4.0 | 4.0 | 4.0 | 4.0 | 4.0 |
| b/A | 0.20 | 0.33 | 0.33 | 0.33 | 0.33 | 0.33 | 0.33 | 0.33 | 0.33 | 0.33 | 0.33 | 0.33 |
| Presence or Absence of First rubber portion and Second rubber portion | | | | | | Both present | | | | | | |
| Engagement with Rim [index: larger is better] | 100 | 120 | 125 | 115 | 120 | 105 | 110 | 120 | 115 | 105 | 110 | 115 |
| Steering stability [evaluation point: larger is better] | 100 | 120 | 110 | 120 | 90 | 110 | 105 | 115 | 120 | 110 | 105 | 115 |
| Total points | 200 | 240 | 235 | 235 | 210 | 215 | 215 | 235 | 235 | 215 | 215 | 230 |

|  | Ex. 7 | Ref. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|
| Angle α [degree] | 23 | 23 | 23 | 23 | 23 | 23 | 23 | 23 | 23 | 23 | 23 | 23 |
| Angle β [degree] | 5 | 5 | 5 | 5 | 5 | 5 | 5 | 5 | 5 | 5 | 5 | 5 |
| Radius of curvature (R) of Heel-side arc portion [mm] | 3.5 | 4.0 | 2.5 | 2.5 | 2.5 | 2.5 | 2.5 | 2.5 | 2.5 | 2.5 | 2.5 | 2.5 |
| A/B | 2.0 | 2.0 | 1.5 | 1.7 | 2.4 | 2.6 | 2.0 | 2.0 | 2.0 | 2.0 | 2.0 | 2.0 |
| A | 12 | 12 | 9 | 10 | 12 | 12 | 12 | 12 | 12 | 12 | 12 | 12 |
| B | 6 | 6 | 6 | 6 | 5 | 4.6 | 6 | 6 | 6 | 6 | 6 | 6 |
| a/b | 0.5 | 0.5 | 0.5 | 0.5 | 0.5 | 0.5 | 1.0 | 0.4 | 0.7 | 0.3 | 0.8 | 0.5 |
| a | 2.0 | 2.0 | 1 | 1.4 | 2.4 | 2.5 | 3.0 | 1.8 | 2.5 | 1.4 | 2.7 | 2.0 |
| b | 4.0 | 4.0 | 2 | 2.6 | 4.6 | 4.9 | 3.0 | 4.2 | 3.5 | 4.6 | 3.3 | 4.0 |
| b/A | 0.33 | 0.33 | 0.22 | 0.26 | 0.38 | 0.41 | 0.25 | 0.35 | 0.29 | 0.38 | 0.28 | 0.33 |
| Presence or Absence of First rubber portion and Second rubber portion | | | | | Both present | | | | | | | Only First rubber portion present |
| Engagement with Rim [index: larger is better] | 115 | 105 | 120 | 118 | 115 | 110 | 122 | 116 | 121 | 113 | 112 | 120 |
| Steering stability [evaluation point: larger is better] | 115 | 105 | 110 | 115 | 118 | 120 | 115 | 122 | 116 | 123 | 120 | 115 |
| Total points | 230 | 210 | 230 | 233 | 233 | 230 | 237 | 238 | 237 | 236 | 232 | 235 |

As is clear from Table 1, it was confirmed that the steering stability and the engagement with the rim were significantly improved in a good balance for the pneumatic tires as the examples as compared with the references.

The invention claimed is:

1. A pneumatic tire comprising:
a pair of bead portions each having a bead core disposed therein,
each of the bead portions having a bead toe, a bead bottom surface, and a flange contacting surface which is an outer surface of the bead portion in a tire axial direction, wherein axially outside, and comprises a toe-side portion, a heel-side portion, and a heel-side arc portion, the toe-side portion extends axially outwardly from the bead toe at an angle α in a range of from 17 to 24 degrees with respect to the tire axial direction, the heel-side portion is positioned axially outside the toe-side portion, and extends axially outwardly at an angle β in a range of from 3 to 7 degrees with respect to the tire axial direction, the heel-side arc portion smoothly connects between the heel-side portion and the flange contacting surface with a radius of curvature (R) in a range of from 1.5 to 3.5 mm, the toe-side portion and the heel-side portion are connected by a second arc portion arranged between the toe-side portion and the heel-side portion, the second arc portion having an arc shape convex radially outwardly with a radius of curvature in a range of from 3 to 8 mm.

2. The pneumatic tire according to claim 1, wherein
in the pre-mounted state, a bead bottom width (A), which is a distance in the tire axial direction between the bead toe and the flange contacting surface, is in a range of from 1.7 to 2.4 times a maximum width (B) in the tire axial direction of the bead core.

3. The pneumatic tire according to claim 2, wherein
in the bead portion in the pre-mounted state, a rubber thickness (a) in the tire axial direction between the bead core and the flange contacting surface is smaller than a rubber thickness (b) in the tire axial direction between the bead core and the bead toe.

4. The pneumatic tire according to claim 2, wherein
the bead portion is provided axially inside the bead core with a first rubber portion and a second rubber portion disposed axially inside the first rubber portion, and
the second rubber portion contains more butyl rubber than the first rubber portion.

5. The pneumatic tire according to claim 1, wherein
in the bead portion in the pre-mounted state, a rubber thickness (a) in the tire axial direction between the bead core and the flange contacting surface is smaller than a rubber thickness (b) in the tire axial direction between the bead core and the bead toe.

6. The pneumatic tire according to claim 5, wherein
the rubber thickness (b) is not less than 0.2 times a bead bottom width (A) which is a distance in the tire axial direction between the bead toe and the flange contacting surface.

7. The pneumatic tire according to claim 6, wherein
the bead portion is provided axially inside the bead core with a first rubber portion and a second rubber portion disposed axially inside the first rubber portion, and
the second rubber portion contains more butyl rubber than the first rubber portion.

8. The pneumatic tire according to claim 5, wherein
the bead portion is provided axially inside the bead core with a first rubber portion and a second rubber portion disposed axially inside the first rubber portion, and
the second rubber portion contains more butyl rubber than the first rubber portion.

9. The pneumatic tire according to claim 1, wherein
the bead portion is provided axially inside the bead core with a first rubber portion and a second rubber portion disposed axially inside the first rubber portion, and
the second rubber portion contains more butyl rubber than the first rubber portion.

10. The pneumatic tire according to claim 1, wherein the angle $\beta$ is in a range of from 5 to 7 degrees.

11. The pneumatic tire according to claim 1, wherein the angle $\beta$ is in a range of from 3 to 5 degrees.

12. The pneumatic tire according to claim 1, wherein
the toe-side portion and the heel-side portion are connected by an arc portion having an arc shape convex radially outwardly.

13. The pneumatic tire according to claim 1, wherein
the difference between the angle $\alpha$ and the angle $\beta$ is in a range of from 12 to 20 degrees.

* * * * *